United States Patent [19]
Cleveland et al.

[11] 3,894,773
[45] July 15, 1975

[54] DIFFERENTIAL BRAKING SYSTEM FOR TRACTOR TRAILER TRUCKS

[75] Inventors: Dixon Cleveland; Roger L. Barron, both of Annandale, Va.; Lewey O. Gilstrap, Jr., Washington, D.C.

[73] Assignee: Adaptronics, Inc., McLean, Va.

[22] Filed: Sept. 21, 1973

[21] Appl. No.: 399,521

Related U.S. Application Data

[63] Continuation-in-part of Ser. No. 215,599, Jan. 5, 1972, abandoned.

[52] U.S. Cl............... 303/21 A; 180/103; 188/3 R; 280/446 B; 303/7
[51] Int. Cl................................................ B60t 8/10
[58] Field of Search.............. 180/1, 75, 82 R, 103; 188/3 R, 181 C; 280/400, 446 B; 303/7, 20, 21; 317/5; 324/161; 340/52 R, 53, 62, 263, 282

[56] References Cited
UNITED STATES PATENTS

| | | | |
|---|---|---|---|
| 2,213,221 | 9/1940 | Johnson | 280/400 UX |
| 3,237,177 | 2/1966 | Sparks et al. | 340/282 X |
| 3,599,014 | 10/1971 | Carp | 188/181 C UX |
| 3,614,173 | 10/1971 | Branson | 303/21 P |
| 3,706,351 | 12/1972 | Neisch | 303/21 EB X |

*Primary Examiner*—Trygve M. Blix
*Assistant Examiner*—Stephen G. Kunin
*Attorney, Agent, or Firm*—Jay M. Cantor

[57] ABSTRACT

The use of differential braking of tractor front wheels in such a way as to maintain negligible angular rates between the tractor and trailer while braking, so as to produce balanced braking forces and to prevent jack-knifing.

8 Claims, 3 Drawing Figures

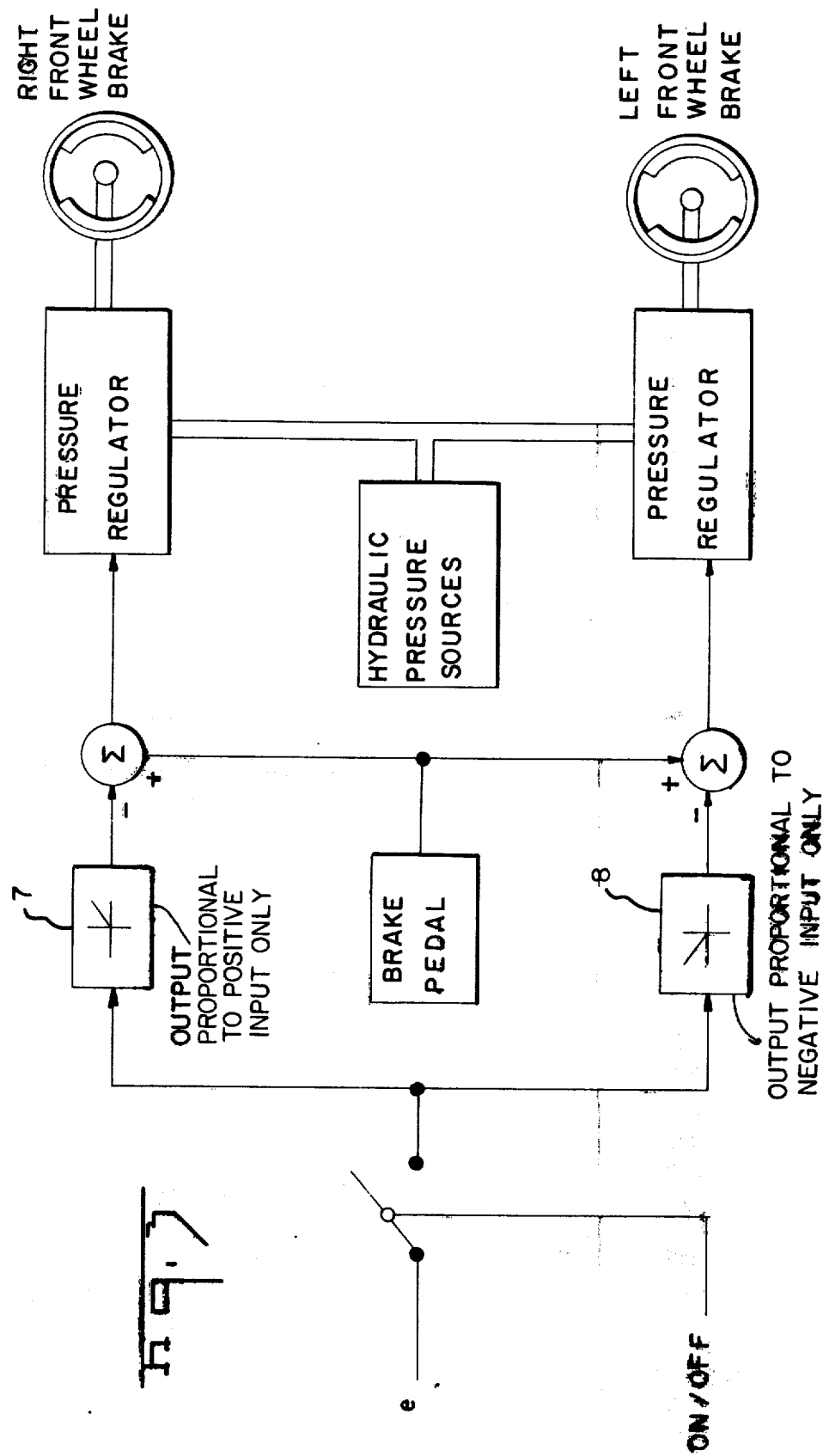

DIFFERENTIAL BRAKING SYSTEM FOR TRACTOR TRAILER TRUCKS

This is a continuation-in-part of our prior copending application Ser. No. 215,599, filed Jan. 5, 1972, now abandoned.

This invention relates to a truck braking system and, more specifically, to a differential braking system for maintaining negligible angular rates between a tractor and trailer while braking.

The advent of stringent federal regulations on braking system performance in heavy, articulated trucks requires several basic improvements in brake controls. The most fundamental need is for elimination of wheel lock during maximum-deceleration stops. The benefits to be derived from prevention of wheel lock include shorter stops and greater lateral stability of the rig. Next in importance is maintenance of brake balance, which is critical for prevention of jackknifing. Although anti-lock systems (if installed on all wheels) tend to maintain balance during maximum-deceleration stops, these systems are inoperative during low-deceleration stops. Brake unbalance is indicated to be the primary cause of truck jackknifing accidents.

Presently, no apparent solution for the brake unbalance problem is known. According to this invention, there is provided a brake control system that automatically corrects for brake unbalance and other causes of jackknifing. This system acts instantly upon application of brake pedal pressure to insure that the angular relationship between the truck tractor and its trailer is preserved for the duration of the braking. The object angular to cause the tractor-trailer rig to behave, when braking, as though it were a single rigid body instead of two bodies articulated at a connecting pivot point.

Whenever the driver applies pressure to the brake pedal (brake light "on" condition), differential-braking logic is engaged. The annular rate between tractor and trailer is computed, and separate braking commands are sent to actuators on the front-left and front-right of the tractor. These commands compensate left and right braking forces to maintain stability of the rig. Steering actions by the driver are thus augmented, when braking, to maintain stability. Hence, greater safety and a smoother ride is achieved. Not only is the driver of the truck still in command of braking and steering functions with the proposed system, but he also has much greater control, because of inherent fast reaction and precision of the electronic augmentation.

It is therefore an object of this invention to provide a patentably novel braking system for automatically insuring preservation of the angular relationship between a tractor and trailer during braking.

The above object and still further objects of the invention will become immediately apparent to those skilled in the art after consideration of the following preferred embodiment thereof, which is provided by way of example and not by way of limitation, wherein:

FIG. 3 is a block diagram of the braking means of FIG. 2.

Anti-skid systems for avoiding wheel lock alleviate the jackknifing problem as well as reduce stopping distances during maximum-deceleration stops because they contribute to brake balance. However, brake maladjustment and wear, unequal treads and pressures on tires, unbalanced loads, and unequal road surface conditions can still produce brake unbalance during maximum-deceleration stops, and, of particular importance, anti-lock systems are inoperative during low-deceleration stops.

Figure 1:
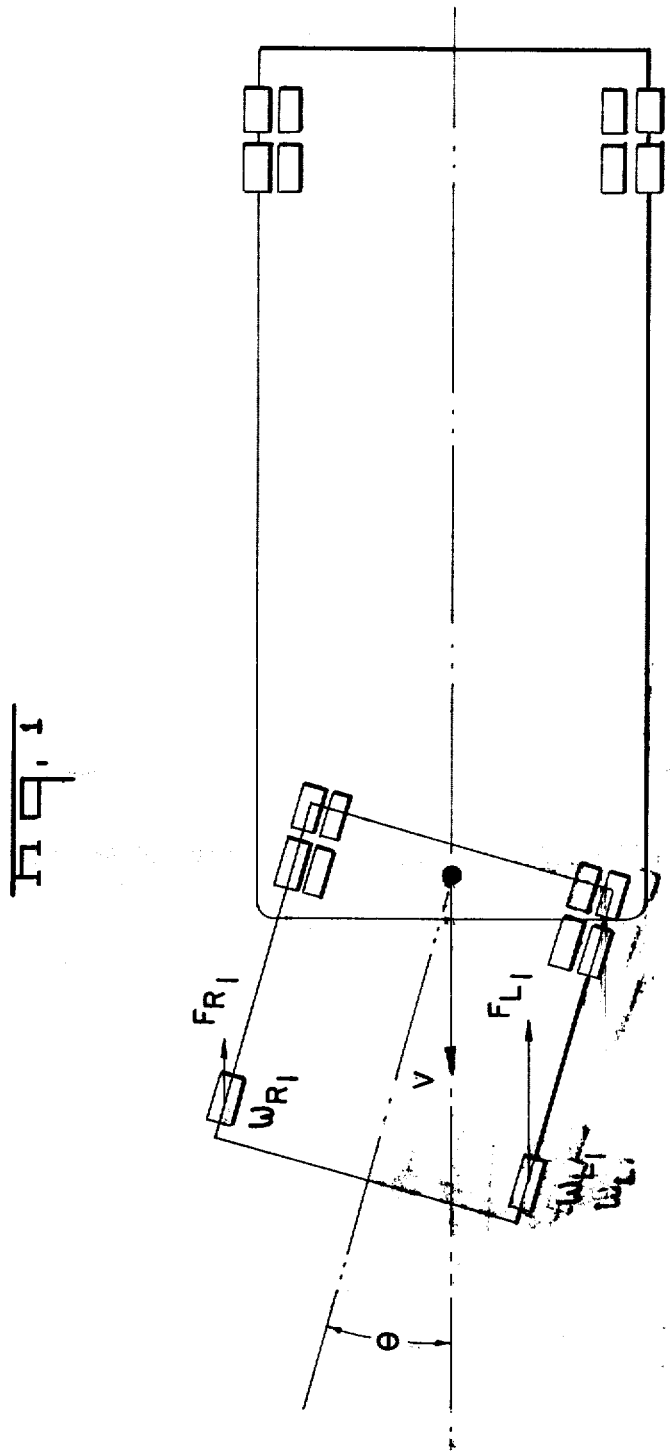
FIG. 1 is a diagram of kinematic relationships in truck braking.

In accordance with the present invention, differential braking of the tractor front wheels is used in such a way as to maintain negligible angular rates between the tractor and trailer while braking. FIG. 1 shows the geometric relationships involved in accomplishing this. Note that if the pivot of the rig is temporarily "frozen" during braking (relatively slow variations of the pivot angle are permitted by the logic), the driver steers as though the vehicle were an automobile or single-unit truck, and jackknifing cannot occur.

The sensor used by the instant anti-jackknife system is a potentiometer which measures a function of the angle $\theta$ between the center lines of the tractor and trailer. This potentiometer is permanently mounted on the tractor and has a moving arm which is attached to any trailer at the time of hook-up. For rigs having multiple trailers, additional sensors are used between trailers. Because the control logic principally employs computed angular rate ($\dot{\theta}$) information, an accurate null point ($\theta = 0$) is unimportant, thus eliminating the need for periodic calibration and drift correction in the logic as well as greatly simplifying hook-up. However, to avoid saturation of the logic circuits, the null point should be nominally at zero output from the potentiometer.

With reference to FIG. 1, control is sought of the forces $F_{L_1}$ and $F_{R_1}$ exerted by the road surface on the respective tires. As is well known, these forces are dependent on $\omega_{L_r}$ and $\omega_{R_1}$, the respective rotational rates of the wheels about their axles. For any given road/tire condition and speed of the vehicle, there is a curve relating the coefficient of braking friction to the wheel slip, the latter defined as $$\text{slip} = \frac{(\text{vehicle speed}) - (\text{wheel speed})}{(\text{vehicle speed})} \quad (1)$$

or $$S = 1 - \frac{\omega_{wheel}}{\omega_{vehicle}} \quad (2)$$

This curve usually has its peak breaking coefficient at slip values between 0.1 and 0.2 (10% – 20% slip). The function of anti-skid systems is to maintain slip in this range during maximum deceleration stops, thereby avoiding wheel lock, for which the retarding (braking) force is greatly reduced and lateral stability is poor. If anti-skid logic is used on an override basis, such logic will prevent excessive slip values, and an increase in wheel slip (decrease in $\omega_{wheel}$) will increase braking friction up to the override threshold.

Therefore, below the anit-skid threshold, one may modulate the braking forces $F_{L_1}$ and $F_{R_1}$ quite simply by modulating the respective wheel speeds. This is the basic mechanism for compensation used by the anti-jackknifing control logic. Once the maximum slip condition is reached (maximum-deceleration braking), the wheel which is to produce the greater braking force should be held at its limiting slip value, with slight reductions made in the slip of the wheel that is momentarily, for purposes of stability compensation, required to produce the lesser braking force.

Figure 2:
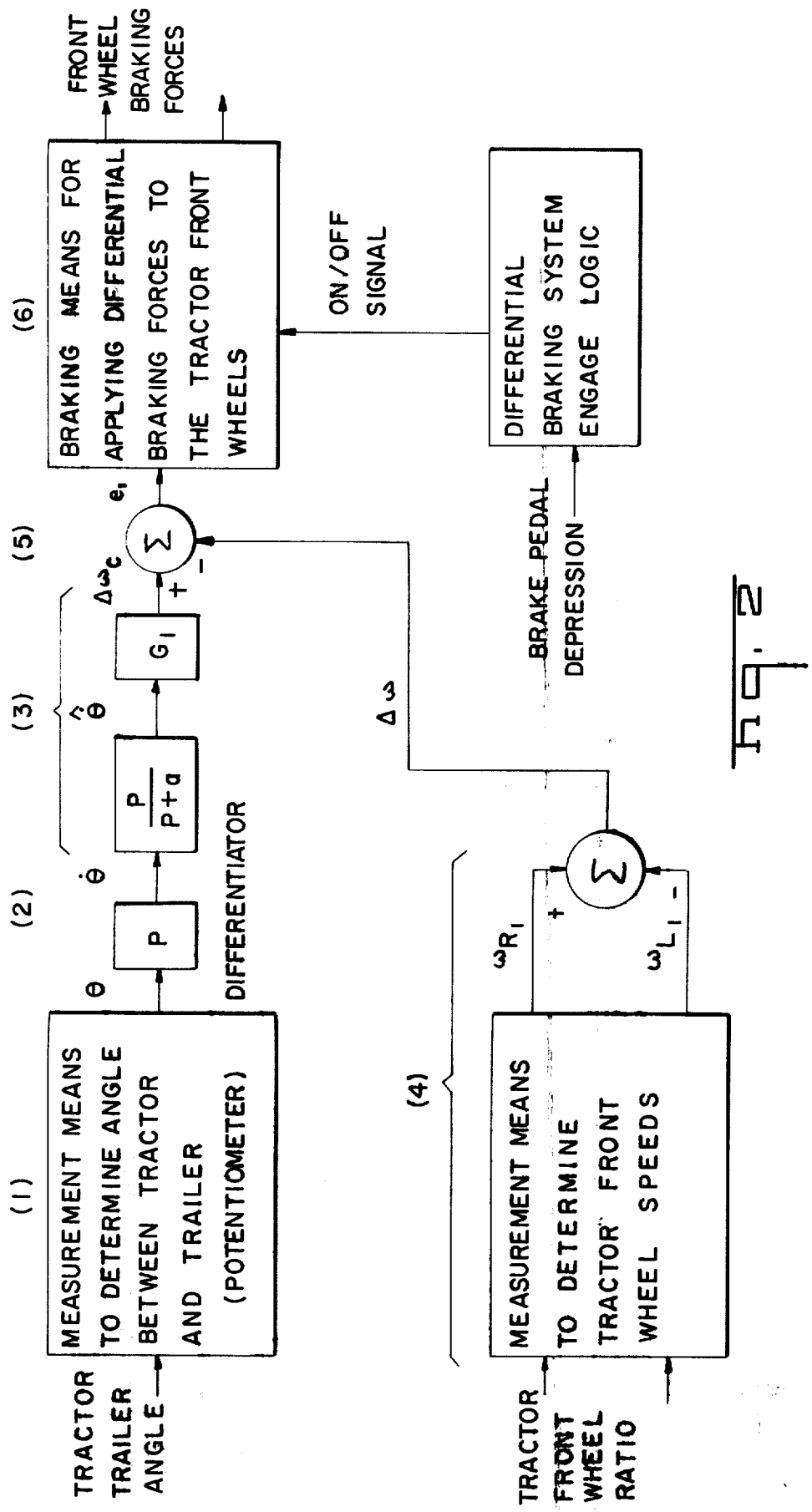
FIG. 2 is a block diagram of the preferred embodiment of the truck braking system of this disclosure.

Accordingly, as shown in FIGS. 2 and 3, the antijackknifing control logic generates either a differential wheel rotational rate command, $\Delta\omega_c$, or a differential wheel slip command, $\Delta S_c$. This anti-jackknifing control logic may be used in combination with antiskid override logic, but it is not necessary that the latter be employed.

Taking $G_1$ and $G_2$ to be positive gain constants, $$\Delta\omega_c = (\omega_{R_1} - \omega_{L_1})_c = G_1 \dot{\theta} \quad (3)$$

or $$\Delta S_c = (S_{L_1} - S_{R_1})_c = G_2 \dot{\theta} \quad (4)$$

where, in a sampled-data system $$\dot{\theta} = \frac{\theta(t) - \theta(t-\Delta t)}{\Delta t} \quad (5)$$

For further ease in steering, one may incorporate electronic high pass circuits by which the differential commands slowly decay with time, viz.

$$\Delta\omega_c = G_1 \left(\frac{p}{p+a_1}\right) \dot{\theta} \quad (6)$$

or $$\Delta S_c = G_2 \left(\frac{p}{p+a_2}\right) \dot{\theta} \quad (7)$$

where $p$ is the Laplace operator and $a_1$ and $a_2$ are positive constants. The values of $a_1$ and $a_2$ determine the decay rates, the decay being faster for large $a_1$ and $a_2$ than for small values of these parameters.

Suitable sensors and logic are required to obtain inputs for the individual brakes. Magnetic or other wheel-rate sensors can be used to measure $\omega_{L_1}$ and $\omega_{R_1}$. Either $\Delta\omega$ or $\Delta S$ can then be computed and compared with its command ($\Delta\omega_c$ or $\Delta S_c$). Given an error signal $$e_1 = \Delta\omega_c - \Delta\omega \quad (8)$$

or $$e_2 = \Delta S_c - \Delta S \quad (9)$$

the proper decision is to reduce slip of one of the wheels so that $e \to 0$. For example, if $\dot{\theta} < 0$, the slip of wheel $R_1$ should be reduced while the slip of $L_1$ should be kept fixed (as long as brake pedal pressure is held constant by the driver and in the absence of antiskid override actions).

FIG. 3 is a block diagram of the contents of the braking means box of FIG. 2. The circuit of FIG. 3 operates on the error signal $e$ under control of the brake pedal which operates an on/off switch. This is to cause the control system to operate only during braking. The circuits 7 and 8 are known circuits which operate on the error ($e$) signal, the circuit 7 providing an output proportional to the magnitude of the error signal only when the error signal is positive and the circuit 8 providing an output proportional to the magnitude of the error signal only when the error signal is negative. The output of the circuits 7 and 8 in conjunction with the output from the brake pedal provides a control signal to the pressure regulator for each wheel to determine the magnitude of the braking force to be applied to each wheel.

A number of actuator servo designs can be employed with the above command logic. For example, a modification of the Hurst-Airhart brake would provide four possible braking states (levels) on the affected wheels ($L_1$ and $R_1$) as well as intermediate states during transients (changes between levels). These states would be:

| braking level | pneumatic pressure |
| --- | --- |
| maximum | 0 |
| medium | $P_1 > 0$ |
| light | $P_2 > P_1$ |
| off | $P_{max} > P_2$ |

If digital circuitry is used in the servos, these four states would be represented by two binary bits in the digital word.

Though the invention has been described with respect to a specific preferred embodiment thereof, many variations and modifications will immediately become apparent to those skilled in the art. It is therefore the intention that the appended claims be interpreted as broadly as possible in view of the prior act to include all such variations and modifications.

What is claimed is:

1. A method of minimizing the angular rate between a tractor and a trailer, comprising the steps of:
   1. measuring a function of the angle between the center lines of the tractor and trailer,
   2. obtaining a time derivative of the function of the angle between the center lines of the tractor and trailer,
   3. computing one of a differential wheel rotational rate and differential wheel slip command from the result of step (2),
   4. measuring one of a function of the wheel rotational rate difference and a function of wheel slip difference between the tractor front wheels,
   5. computing the error between commanded and measured values of at least one of said function of wheel rotational rate difference and said function of wheel slip difference, and
   6. altering one of the rotational rate and the slip of at least one of said front wheels of the tractor in response to the results of step (5).

2. A method according to claim 1 wherein the function of step (1) is measured with a potentiometer.

3. A method according to claim 2 wherein the computation of step (3) includes passing the result of step (2) through a high pass filter.

4. A method according to claim 3 wherein step (6) includes controlling of a tractor braking system having independently variable braking levels for the front wheels.

5. A method according to claim 2 wherein step (6) includes controlling of a tractor braking system having independently variable braking-levels for the front wheels.

6. A method according to claim 1 wherein the computation of step (3) includes passing the result of step (2) through a high pass filter.

7. A method according to claim 6 wherein step (6) includes controlling of a tractor braking system having independently variable braking levels for the front wheels.

8. A method according to claim 1 wherein step (6) includes controlling of a tractor braking system having independently variable braking levels for the front wheels.

* * * * *